US010783899B2

(12) United States Patent
Graf et al.

(10) Patent No.: US 10,783,899 B2
(45) Date of Patent: Sep. 22, 2020

(54) BABBLE NOISE SUPPRESSION

(71) Applicant: Cerence Operating Company, Burlington, MA (US)

(72) Inventors: Simon Graf, Ulm (DE); Tobias Herbig, Ulm (DE); Markus Buck, Biberach (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 16/073,740

(22) PCT Filed: Nov. 18, 2016

(86) PCT No.: PCT/US2016/062908
§ 371 (c)(1),
(2) Date: Jul. 27, 2018

(87) PCT Pub. No.: WO2017/136018
PCT Pub. Date: Aug. 10, 2017

(65) Prior Publication Data
US 2019/0013036 A1    Jan. 10, 2019

Related U.S. Application Data

(60) Provisional application No. 62/291,791, filed on Feb. 5, 2016.

(51) Int. Cl.
*G10L 21/0232* (2013.01)
*G10L 25/84* (2013.01)
(Continued)

(52) U.S. Cl.
CPC .......... *G10L 21/0232* (2013.01); *G10L 15/22* (2013.01); *G10L 21/0208* (2013.01);
(Continued)

(58) Field of Classification Search
CPC ....... G10L 2021/02087; G10L 21/0216; G10L 25/93
(Continued)

(56) References Cited

U.S. PATENT DOCUMENTS

| 2002/0035471 A1* | 3/2002 | Breton ............... G10L 21/0208 704/233 |
| 2012/0095755 A1* | 4/2012 | Otani ..................... G10L 25/00 704/205 |

(Continued)

FOREIGN PATENT DOCUMENTS

| EP | 1 286 334 A2 | 2/2003 |
| EP | 1 729 286 A2 | 12/2006 |

(Continued)

OTHER PUBLICATIONS

Cournapeau, D. et al., "Evaluation of real-time voice activity detection based on high order statistics," in *Proc. of INTERSPEECH*, Antwerp, Belgium, 2007.

(Continued)

*Primary Examiner* — Bharatkumar S Shah
(74) *Attorney, Agent, or Firm* — Occhiuti & Rohlicek LLP

(57) ABSTRACT

Systems and methods are introduced to perform noise suppression of an audio signal. The audio signal includes foreground speech components and background noise. The foreground speech components correspond to speech from a user's speaking into an audio receiving device. The background noise includes babble noise that includes speech from one or more interfering speakers. A soft speech detector determines, dynamically, a speech detection result indicating a likelihood of a presence of the foreground speech components in the audio signal. The speech detection result is employed to control, dynamically, an amount of attenuation of the noise suppression to reduce the babble noise in (Continued)

the audio signal. Further processing achieves a more stationary background and reduction of musical tones in the audio signal.

22 Claims, 9 Drawing Sheets

(51) Int. Cl.
    *G10L 21/0208*     (2013.01)
    *G10L 21/0216*     (2013.01)
    *G10L 15/22*     (2006.01)
    *G10L 25/21*     (2013.01)
    *G10L 25/93*     (2013.01)

(52) U.S. Cl.
    CPC .......... *G10L 21/0216* (2013.01); *G10L 25/21* (2013.01); *G10L 25/84* (2013.01); *G10L 25/93* (2013.01); *G10L 2021/02087* (2013.01)

(58) Field of Classification Search
    USPC ........................................................ 704/233
    See application file for complete search history.

(56) References Cited

U.S. PATENT DOCUMENTS

| | | | |
|---|---|---|---|
| 2012/0245927 A1* | 9/2012 | Bondy | ................ G10L 21/0232 704/203 |
| 2015/0127330 A1 | 5/2015 | Lamy | |
| 2016/0063997 A1* | 3/2016 | Nemala | ................... G10L 15/20 704/233 |

FOREIGN PATENT DOCUMENTS

| | | |
|---|---|---|
| JP | 2012 181233 A | 9/2012 |
| WO | WO2017/136018 | 8/2017 |

OTHER PUBLICATIONS

Cournapeau, D. et al., "Voice activity detector based on enhanced cumulant of LPC residual and on-line EM algorithm," in *Proc. of INTERSPEECH*, Pittsburgh, PA, USA, 2006.
ETSI, "ETSI standard 202 050 v1.1.5: Advanced front-end feature extraction algorithm," 2007.
Garofolo, J. S. et al., "DARPA TIMIT Acoustic-Phonetic Continuous Speech Corpus CD-ROM," 1993.
Gillespie, B.W. et al., "Speech dereverberation via maximum-kurtosis subband adaptive filtering," in Proc. of IEEE International Conference on Acoustics, Speech, *and Signal Processing (ICASSP)*, Salt Lake City, UT, USA, 2001.
Graf, S. et al., "Features for voice activity detection: a comparative analysis," *EURASIP* Journal on Advances in Signal Processing, vol. 2015, No. 91 (Nov. 2015).
ITU, "Recommendation ITU-R BS.1534-3: Method for the subjective assessment of intermediate quality level of audio systems," 2015.
Krishnamurthy, N. et al., "Babble Noise: Modeling, Analysis, and Applications," IEEE Transactions on Audio, Speech, and *Language Processing*, vol. 17, No. 7, pp. 1394-1407 (Sep. 2009).
Li, G. et al., "Sparseness and speech perception in noise," in Proc. of Statistical and Perceptual Audition (SAPA), Pittsburgh PA, USA, 2006.
Nemer, E. et al., "Robust voice activity detection using higher-order statistics in the LPC residual domain," IEEE Transactions on Speech and Audio Processing, vol. 9, No. 3, pp. 217-231 (2001).
Rajan, V.K. et al., "Improvement in Listener Comfort Through Noise Shaping Using a Modified Wiener Filter Approach," in *Proc. of 11. ITG* Symposium on Speech Communication, Erlangen, Germany, 2014.
Varga, A. et al., "Assessment for automatic speech recognition: II. NOISEX-92: A database and an experiment to study the effect of additive noise on speech recognition systems," *Speech Communication*, vol. 12, No. 3, pp. 247-251 (1993).
Gemello, R., et al., "A Modified Ephraim-Malah Noise Suppression Rule for Automatic Speech Recognition", *Acoustics, Speech, and Signal Processing, Proceedings, IEEE*, vol. 1, pp. 957-960 (2004).
Hayashida K., et al. "Close/Distant Talker Discrimination Based On Kurtosis Of Linear Prediction Residual Signals", *IEEE International Conference On Acoustics, Speech And Signal Processing*, pp. 2327-2331 (2014).
International Search Report for International Application No. PCT/US2016/062908, entitled "Babble Noise Suppression," comprising of 5 pages, dated Mar. 31, 2017.
International Preliminary Report on Patentability for International Application No. PCT/US2016/062908, entitled "Babble Noise Suppression," comprising of 12 pages, dated Aug. 7, 2018.
European Examination Report dated Sep. 4, 2019 from corresponding European Patent Application No. 16 808 870.6, 9 pages.
Graf et al.; "Kurtosis-Controlled Babble Noise Suppression", ITG-Fachbericht 267: Speech Communication, Jul. 10, 2016, pp. 307-311.
Nemer et al.; "Speech Enhancement Using Fourth-Order Cumulants and Time-Domain Optimal Filters"; Eurospeech, vol. 6, Sep. 5, 1999, pp. 2623-2626.

\* cited by examiner

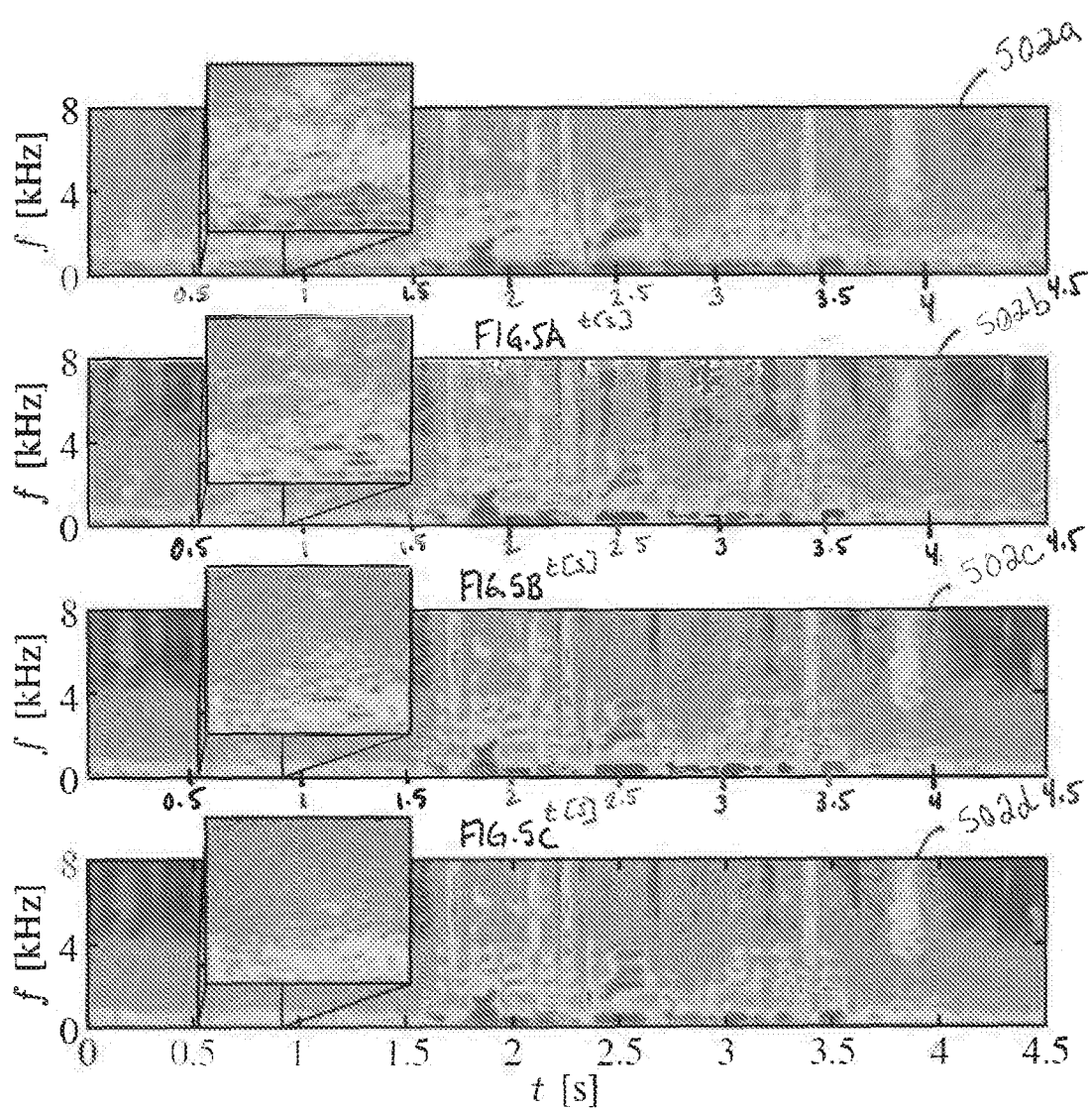

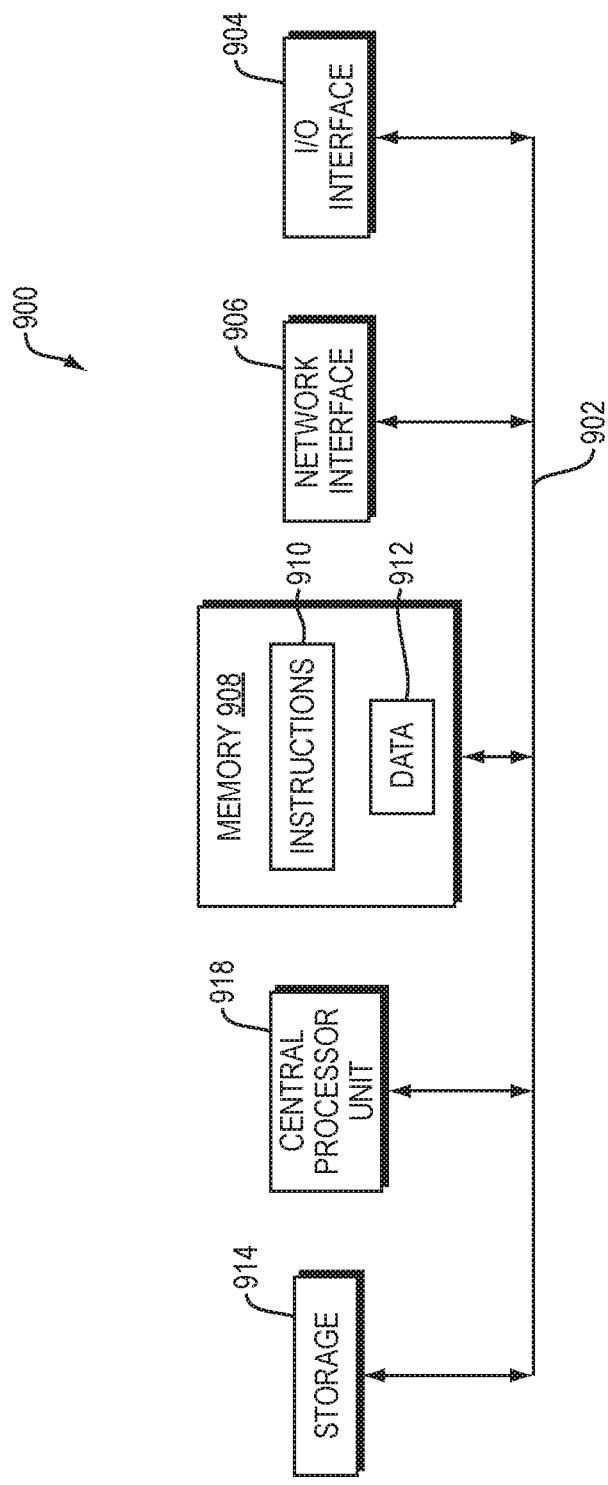

BABBLE NOISE SUPPRESSION

RELATED APPLICATIONS

This application is the U.S. National Stage of International Application No. PCT/US2016/062908, filed on Nov. 18, 2016, which designates the U.S., published in English, and claims the benefit of U.S. Provisional Application No. 62/291,791, filed on Feb. 5, 2016. The entire teachings of the above applications are incorporated herein by reference.

BACKGROUND

Speech-controlled applications and devices supporting human speech communication are becoming more and more popular. Human-computer interfaces based on speech recognition allow users to dictate text and control devices using spoken commands comprising speech utterances. A speech detector may be employed for speech recognition to determine a beginning and end of such speech utterances.

SUMMARY

According to one example embodiment, a system may be configured to perform noise suppression of an audio signal, the audio signal including foreground speech components and background noise. The system may comprise a soft speech detector configured to determine, dynamically, a speech detection result indicating a likelihood of a presence of the foreground speech components in the audio signal. The system may further comprise a noise suppressor. The noise suppressor may be communicatively coupled to the soft speech detector to receive the speech detection result determined and may be configured to compute, dynamically, spectral weighting coefficients based on the speech detection result determined. The noise suppressor may be further configured to apply the spectral weighting coefficients computed to the audio signal to suppress the background noise in a dynamic manner.

The noise suppressor may compute, dynamically, a dynamic noise overestimation factor based on the speech detection result determined. The spectral weighting coefficients may be computed based on the dynamic noise overestimation factor. The noise suppressor may determine periods of speech pauses and periods of speech activity in the audio signal as a function of the speech detection result determined. The noise suppressor may increase a value of the dynamic noise overestimation factor for the periods of speech pauses determined relative to the value of the dynamic noise overestimation factor for the periods of speech activity determined. Increasing the value of the dynamic noise overestimation factor may enable the spectral weighting coefficients computed to increase suppression of the background noise relative to an amount of suppression of the background noise for the periods of speech activity determined.

The system may further comprise a spectrum estimator configured to estimate a power spectrum of the audio signal based on a transformation of the audio signal from a time domain to a frequency domain. The soft speech detector may be further configured to determine the speech detection result as a function of a combination of feature values determined in the time domain, frequency domain, or a combination thereof.

The combination of feature values may include kurtosis and at least one other feature value.

The background noise may include stationary and non-stationary noise components. Changes in a power spectrum of the audio signal over a time interval may be less for the stationary noise components than for the non-stationary noise components.

The noise suppressor may be further configured to compute, dynamically, a dynamic noise floor, and selectively lower the dynamic noise floor based on frequencies corresponding to the non-stationary noise components. The spectral weighting coefficients may be computed further based on the dynamic noise floor computed and selectively lowered.

The noise suppressor may be further configured to identify one or more spectral weighting coefficients from the spectral weighting coefficients computed based on contextual information from neighboring spectral weighting coefficients. The noise suppressor may post-process the spectral weighting coefficients computed by setting first values computed for the one or more spectral weighting coefficients identified to second values. The second values may enable a stronger attenuation of the background noise than the first values. The applying may include applying the spectral weighting coefficients computed and post-processed.

The system may further comprise a pre-processing unit. The pre-processing unit may be configured to pre-process the audio signal to pre-emphasize spectral characteristics of the audio signal. The soft speech detector and the noise suppressor may be further configured to determine, dynamically, the speech detection result and compute, dynamically, the spectral weighting coefficients, respectively, for a given time interval of the pre-processed audio signal. The noise suppressor may apply the spectral weighting coefficients computed to the pre-processed audio signal in the given time interval.

The foreground speech components may correspond to speech from a user speaking into an audio receiving device. The background noise may include babble noise. The babble noise may include a composition of multiple background speech components from other speakers.

According to another example embodiment, a method may perform noise suppression of an audio signal. The audio signal may include foreground speech components and background noise. The method may determine, dynamically, a speech detection result indicating a likelihood of a presence of the foreground speech components in the audio signal. The method may compute, dynamically, spectral weighting coefficients based on the speech detection result determined and may apply the spectral weighting coefficients computed to the audio signal to suppress the background noise in a dynamic manner.

The method may compute, dynamically, a dynamic noise overestimation factor based on the speech detection result determined. The spectral weighting coefficients may be computed based on the dynamic noise overestimation factor. The method may determine periods of speech pauses and periods of speech activity in the audio signal as a function of the speech detection result determined. The method may increase a value of the dynamic noise overestimation factor for the periods of speech pauses determined relative to the value of the dynamic noise overestimation factor for the periods of speech activity determined. Increasing the value of the dynamic noise overestimation factor may enable the spectral weighting coefficients computed to increase suppression of the background noise relative to an amount of suppression of the background noise for the periods of speech activity determined.

The method may estimate a power spectrum of the audio signal based on a transformation of the audio signal from a time domain to a frequency domain. The speech detection result determined may be a function of a combination of feature values determined in the time domain, frequency domain, or a combination thereof.

The combination of feature values may include kurtosis and at least one other feature value.

The background noise may include stationary and non-stationary noise components.

Changes in a power spectrum of the audio signal over a time interval may be less for the stationary noise components than for the non-stationary noise components.

The method may compute, dynamically, a dynamic noise floor, and selectively lower the dynamic noise floor based on frequencies corresponding to the non-stationary noise components. Computing the spectral weighting coefficients may be further based on the dynamic noise floor computed and selectively lowered.

The method may identify one or more spectral weighting coefficients from the spectral weighting coefficients computed based on contextual information from neighboring spectral weighting coefficients. The method may post-process the spectral weighting coefficients computed by setting first values computed for the one or more spectral weighting coefficients identified to second values. The second values may enable a stronger attenuation of the background noise than the first values. The applying may include applying the spectral weighting coefficients computed and post-processed.

The method may pre-process the audio signal to pre-emphasize spectral characteristics of the audio signal. The speech detection result may indicate the likelihood of the presence of the foreground speech components in the pre-processed audio signal. The determining and the computing may be performed for a given time interval of the pre-processed audio signal. The applying may include applying the spectral weighting coefficients computed to the pre-processed audio signal in the given time interval.

The foreground speech components may correspond to speech from a user speaking into an audio receiving device. The background noise may include babble noise. The babble noise may include a composition of multiple background speech components from other speakers.

Yet another example embodiment may include a non-transitory computer-readable medium having stored thereon a sequence of instructions which, when loaded and executed by a processor, causes the processor to complete methods disclosed herein.

It should be understood that embodiments disclosed herein can be implemented in the form of a method, apparatus, system, or computer readable medium with program codes embodied thereon.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5A is an example embodiment of a spectrogram for an unprocessed noisy input signal.

FIGS. 5B-D are example embodiments of spectrograms showing improvements for babble noise suppression according to example embodiments disclosed herein.

FIG. 9 is a block diagram of an example internal structure of a computer optionally within an embodiment disclosed herein.

DETAILED DESCRIPTION

Figure 1:
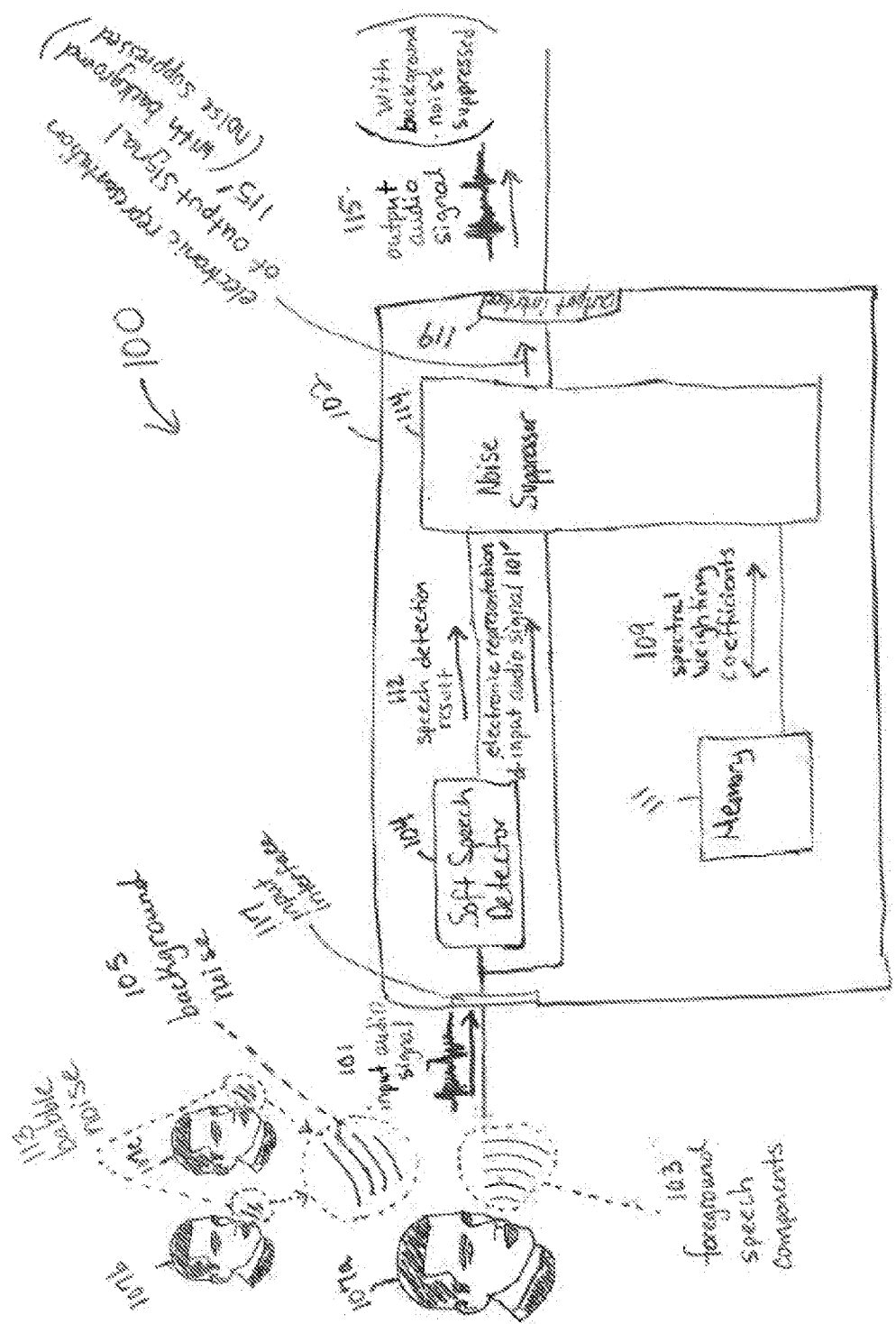
FIG. 1 is a block diagram of an example embodiment of a system configured to perform noise suppression of an audio signal.

Mobile speech applications employed by devices, such as smartphones, may be utilized in crowded surroundings. As a user speaks to the device, background noise (also referred to interchangeably herein as "noise" or "environmental noise") may be present. The background noise may include speech from one or more interfering speakers that may be talking in the background while the user speaks to the device. The speech from the one or more interfering speakers may be referred to interchangeably herein as "babble," "babble noise," "babble speech," or "interfering speech" and may be present in a crowded environment in which multiple persons are speaking. The crowded environment may be a public space, such as a restaurant or café, or any other suitable space in which multiple persons are speaking.

A speech application that includes a speech processing method may be employed on a device that may be used by a user speaking to the device in the crowded environment, and, thus, the speech application may experience a crowded environment noise condition. For example, the speech application may receive as input an electronic representation of the user's voice that may be superposed with interfering voices. In contrast to other noise conditions, such as an automotive noise condition that may include engine or wiper noise, the crowded environment noise condition may include babble noise that contains portions of interfering speech from the interfering voices. The crowded environment noise condition that includes the babble noise may be referred to herein as a babble noise scenario and poses a challenge for speech processing methods. Assumptions, such as stationarity of the noise or a good Signal to Noise Ratio (SNR), may not be valid for babble noise scenarios. According to embodiments disclosed herein, other distinctive properties may be considered for distinguishing the babble noise from the user's speech.

Since the background noise contains speech portions, it is a particularly challenging scenario for many speech processing methods (Nitish Krishnamurthy and John H. L. Hansen, "Babble Noise: Modeling, Analysis, and Applications," IEEE Transactions on Audio, Speech, and Language Processing, vol. 17, no. 7, pp. 1394-1407, September 2009), such as speech detection methods or noise reduction methods. Speech detection methods or speech detectors that distinguish between desired foreground speech (also referred to interchangeably herein as "foreground speech components," "user speech," or "desired speech") and the background noise, may be triggered, falsely, by the interfering speech, that is, the babble noise, that may be present in the background noise. Therefore, an elaborated speech detector that maintains reliable results under such an adverse condition, that is, the presence of babble noise, may be useful.

The background noise may include stationary and non-stationary noise components. Changes in a power spectrum of the audio signal over a time interval may be less for the stationary noise components than for the non-stationary noise components. Standard noise reduction approaches primarily target on reducing stationary background noise components in an audio signal. Non-stationary components of babble noise are, therefore, not sufficiently suppressed. As a result, the non-stationary components may remain as annoying artifacts in the processed audio signal. Embodiments disclosed herein are motivated by a desire to deal with babble noise while not affecting the desired foreground speech, that is, the speech from the user speaking to the device.

Characteristics of babble noise are disclosed herein and distinctive features summarized that enable distinguishing of the desired foreground speech from the babble noise. In particular, according to embodiments disclosed herein, kurtosis of a signal is identified as a good measure to use to detect the presence of the desired foreground speech even in the presence of babble noise. It should be understood that detection of the presence may be in the form of a hard result, such as a boolean true/false type indicator, or in the form of a soft result, that is, a probability value that indicates the probability of the presence of the desired foreground speech.

According to embodiments disclosed herein, a babble noise suppression system is introduced that distinguishes between the desired foreground speech and the babble noise. In an example embodiment, an aggressiveness (i.e., an attenuation amount, strength of attenuation, or attenuation level) of the noise suppression may be controlled by a kurtosis-based speech detector. Strong attenuation may be applied during absence of speech whereas the aggressiveness may be reduced, dynamically, in response to speech being detected. In addition, according to embodiments disclosed herein, annoying fluctuations in the background noise may be reduced to achieve a more stationary background in a processed audio signal.

According to embodiments disclosed herein, strong suppression of the babble noise is desired from the babble noise suppression system. In addition, any remaining noise after processing the audio signal should be perceived as pleasant by human listeners. To evaluate improvements achieved by an example embodiment of a babble noise suppression system disclosed herein, results from a subjective listening test are presented, as disclosed further below in the Results section. Further, an acceptability of the remaining background noise after processing is assessed, as disclosed in the Results section.

FIG. 1 is a block diagram 100 of an example embodiment of a system 102 configured to perform noise suppression of an input audio signal 101. The input audio signal 101 may include foreground speech components 103 and background noise 105. The system 102 may comprise an input interface 117, that may be a hardware input interface or any other suitable interface, configured to transform the input audio signal 101 into an electronic representation of the input audio signal 101' for input to a soft speech detector 104. The soft speech detector 104 may be configured to determine, dynamically, a speech detection result 112. The speech detection result 112 may indicate a likelihood (i.e., a probability value) of a presence of the foreground speech components 103 in the input audio signal 101. The system 102 may further comprise a noise suppressor 114 communicatively coupled to the soft speech detector 104 to receive the speech detection result 112 determined and the electronic representation of the input audio signal 101'. The noise suppressor 114 may be configured to compute, dynamically, spectral weighting coefficients 109 based on the speech detection result 112 determined and may apply the spectral weighting coefficients 109 computed to the electronic representation of the input audio signal 101' to suppress the background noise 105 in a dynamic manner.

The system 102 may comprise a memory 111 and the noise suppressor 114 may be configured to store the spectral weighting coefficients 109 computed in the memory 111. The noise suppressor 114 may be configured to retrieve the spectral weighting coefficients 109 computed from the memory 111 to apply the spectral weighting coefficients 109 computed to the electronic representation of the input audio signal 101'.

The soft speech detector 104 may be referred to as a "soft" speech detector because the soft speech detector 104 may determine the speech detection result 112 that may represent a likelihood (i.e., probability value) of a presence of the foreground speech components 103 as opposed to a "hard" result that represents a definitive true/false boolean type of result for indicating whether the foreground speech components 103 are present. As such, a "soft" speech detector may be a speech detector that produces a "soft" speech detection result that represents a likelihood (i.e., probability) of a presence of speech components in an audio signal.

The foreground speech components 103 may correspond to speech from a user's voice, such as speech from a voice of a user 107a that may be speaking to the system 102. The background noise 105 may include the babble noise 113. The babble noise 113 may include a composition of multiple background speech components from one or more other speakers, such as the user 107b and the user 107c. The system 102 may be referred to interchangeably herein as a babble noise suppression system 102.

The soft speech detector 104 may be further configured to determine the speech detection result 112 as a function of a combination of feature values determined in the time domain, frequency domain, or a combination thereof. The combination of feature values may include kurtosis and at least one other feature value as disclosed below with reference to FIG. 2. It should be understood that in the example embodiment of FIG. 2 the at least one other feature value is a cepstral maximum feature value, however, any other suitable feature value that reflects the presence of speech may be employed for combination with the kurtosis feature value. For example, power, signal-to-noise power ratio, harmonicity, or pitch-based features may be employed, or any other suitable feature that reflects the presence of speech.

According to embodiments disclosed herein, the system 102 may employ the soft speech detector 104 to control, dynamically, an aggressiveness (i.e., an attenuation strength) of noise suppression of the electronic representation of the input audio signal 101' by the noise suppressor 114. As such, the babble noise suppression system 102 may produce an electronic representation of an output audio signal 115' with the background noise 105 suppressed. The electronic representation of the output audio signal 115' may be output as the output audio signal 115 by an output interface 119, that may be a hardware interface configured to produce the output audio signal 115 (also referred to interchangeably herein as a processed audio signal 115) in an audible form. As disclosed further below in the Results section, any remaining noise in the processed audio signal 115 may be perceived by human listeners as more pleasant than the background noise 105 of the audio signal 101. Further embodiments of the babble noise suppression system 102 are disclosed below with regard to FIG. 2.

Figure 2:
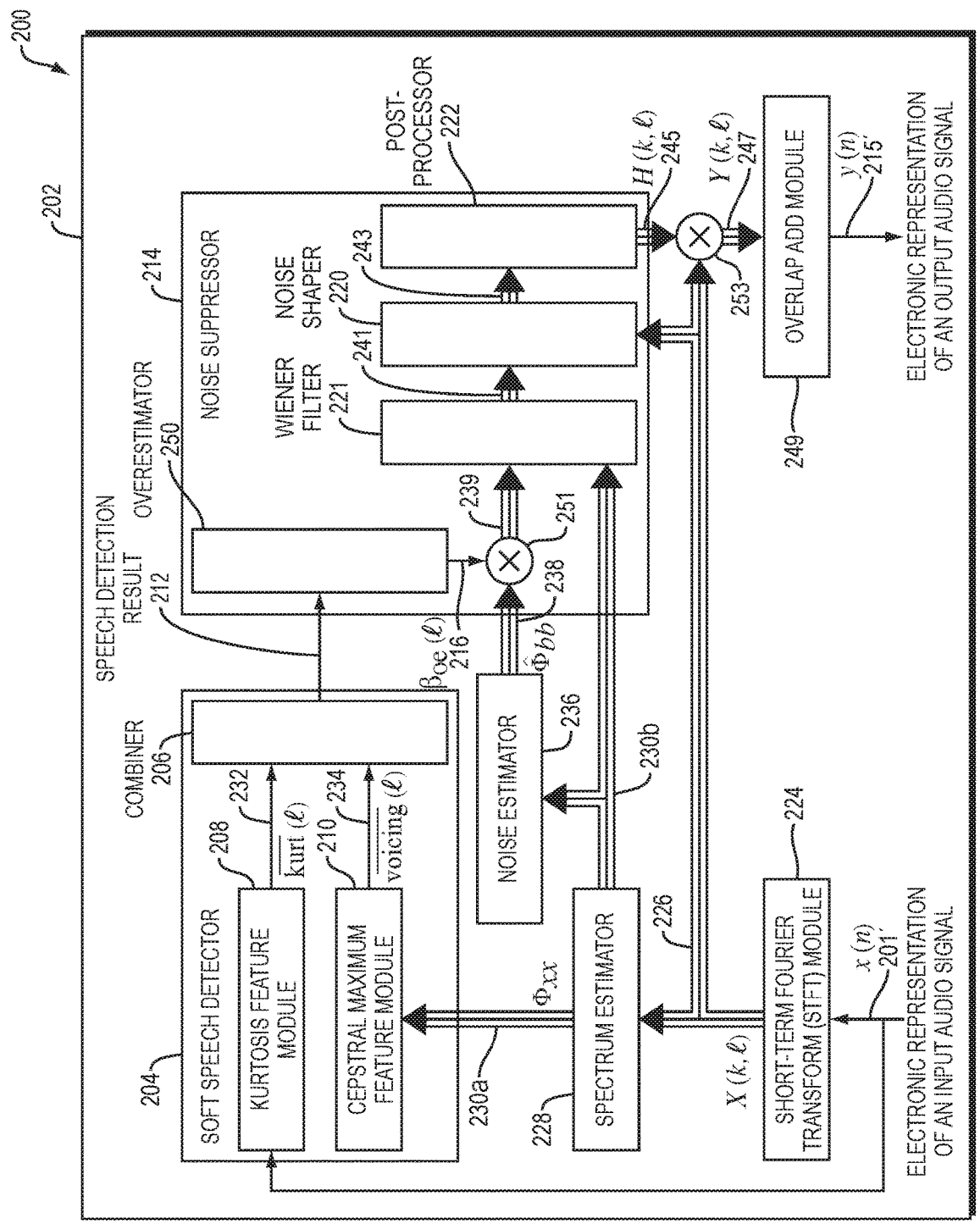
FIG. 2 is a block diagram of another example embodiment of a system configured to perform noise suppression of an audio signal.

FIG. 2 is a block diagram 200 of another example embodiment of a system 202 configured to perform noise suppression of an electronic representation of an input audio signal 201'. According to one embodiment, the electronic representation of the input audio signal 201', that is x(n), where n is the sample index, may be an electronic representation of a pre-emphasized input audio signal. Alternatively, x(n) may not be pre-emphasized. The system 202 may also be referred to interchangeably herein as a babble noise suppression system 202. The babble noise suppression system 202 may be separated into two main parts, a soft speech detector 204 and a noise suppressor 214. The noise suppressor 214 may determine spectral weighting coefficients in order to suppress the babble noise, as disclosed further below in the Noise Suppression section.

The soft speech detector 204 may determine a speech detection result 212 that indicates a likelihood of presence of desired speech in an input audio signal, such as the likelihood of the presence of the foreground speech components 103 of the input audio signal 101 of FIG. 1, disclosed above. The soft speech detector 204 may determine the speech detection result 212 as a function of a combination of feature values determined in the time domain, frequency domain, or a combination thereof. As such, the speech detection result 212 may be referred to interchangeably herein as a combined speech detection result 212. The combination of feature values may include kurtosis and at least one other feature value.

According to one embodiment, the soft speech detector 204 may include a kurtosis feature module 208, a cepstral maximum feature module 210, and a combiner 206. The combiner 206 may be configured to combine a kurtosis feature 232, produced by the kurtosis feature module 208, with a cepstral maximum feature 234, produced by the cepstral maximum feature module 210, to produce the speech detection result 212, as disclosed further below with regard to Equations 2-8. The speech detection result 212 may be employed to control the noise suppressor 214.

For example, the noise suppressor 214 may be designed to attenuate the background noise, such as the background noise 105 of FIG. 1, more aggressively during speech pauses (not shown) of the electronic representation of the input audio signal 201', and such speech pauses may be identified as a function of the speech detection result 212 produced by the soft speech detector 204. According to embodiments disclosed herein, spectral weighting coefficients, such as the Wiener filter spectral weighting coefficients 241, modified spectral weighting coefficients 243, and final spectral weighting coefficients 245, may be determined by the noise suppressor 214 to enable the babble noise suppression system 202 to apply stronger attenuation during the speech pauses based on overestimating the noise.

The noise suppressor 214 may include a noise shaper 220 and post-processor 222 to achieve a more stationary electronic representation of the output audio signal 215' by applying noise shaping and post-processing, respectively, as disclosed further below in the Noise Suppression section. Embodiments of the soft speech detectors 104 and 204 of FIGS. 1 and 2, respectively, are disclosed below in the Speech Detection section. Embodiments of the noise suppressors 114 and 214 of FIGS. 1 and 2, respectively, are disclosed further below in the Noise Suppression section.

Speech Detection

Detecting presence of desired speech in a noisy signal has been subject to research for several decades (Simon Graf, Tobias Herbig, Markus Buck, and Gerhard Schmidt, "Features for voice activity detection: a comparative analysis," EURASIP Journal on Advances in Signal Processing, vol. 2015, no. 91, November 2015). The overlapping characteristics of the desired speech and the babble noise complicate detection of the desired speech. Embodiments disclosed herein include features that enable for a robust distinction between the babble noise and the desired speech.

Clean speech (i.e., speech in the absence of noise) sample values exhibit a sparse characteristic. Values close to zero are dominating which implies a peak of the probability density function (PDF) around zero. No or only little reverberation can be expected. To find distinctive properties of babble noise, two effects appear relevant (Nitish Krishnamurthy and John H. L. Hansen, "Babble Noise: Modeling, Analysis, and Applications," IEEE Transactions on Audio, Speech, and Language Processing, vol. 17, no. 7, pp. 1394-1407, September 2009):

independent speech components from multiple distant talkers superpose, and reverberation smears, temporally, the speech component of each distant talker.

Both effects result in a mixture of multiple samples of speech signals. The distribution of this mixture differs from the distribution of clean speech. Since multiple independent values are summed, the resulting distribution approaches a Gaussian probability distribution function (PDF). Embodiments disclosed herein exploit this property by evaluating the kurtosis.

A. Kurtosis

The normalized kurtosis of a random variable $\chi$ $$kurt\{\chi\} = \frac{E\{\chi^4\}}{(E\{\chi^2\})^2} - 3 \qquad (1)$$

reflects the peakiness of the PDF (Guoping Li and Mark E. Lutman, "Sparseness and speech perception in noise," in Proc. of Statistical and Perceptual Audition (SAPA), Pittsburgh Pa., USA, 2006). Here, zero-mean $E\{\chi\}=0$ is assumed. Positive values of the kurtosis indicate a sharp peak of the distribution, whereas the kurtosis vanishes for Gaussian distributed variables. Clean speech is, therefore, characterized by high values of the kurtosis. The kurtosis decreases when multiple speech samples are mixed since the result approaches a Gaussian distributed random variable.

This beneficial property of the kurtosis has been employed in different applications: The human speech recognition score in babble noise was predicted in (Guoping Li and Mark E. Lutman, "Sparseness and speech perception in noise," in Proc. of Statistical and Perceptual Audition (SAPA), Pittsburgh Pa., USA, 2006). A high correlation between the value of kurtosis and the score was observed when increasing the number of talkers. Dereverberation of speech signals was performed in (Bradford W. Gillespie, Henrique S. Malvar, and Dinei A F Florêncio, "Speech dereverberation via maximum-kurtosis subband adaptive filtering," in Proc. of IEEE International Conference on Acoustics, Speech, and Signal Processing (ICASSP), Salt Lake City, Utah, USA, 2001) by maximizing the kurtosis value. In (Kohei Hayashida, Makoto Nakayama, Takanobu Nishiura, Yukihiko Yamashita, T. K. Horiuchi, and Toshihiko Kato, "Close/distant talker discrimination based on kurtosis of linear prediction residual signals," in Proc. of IEEE International Conference on Acoustics, Speech, and Signal Processing (ICASSP), Florence, Italy, 2014), the kurtosis was employed to distinguish between close and distant talkers. Kurtosis-based speech detection is discussed in multiple publications, such as (Elias Nemer, Rafik Goubran, and Samy Mahmoud, "Robust voice activity detection using higher-order statistics in the LPC residual domain," IEEE Transactions on Speech and Audio Processing, vol. 9, no. 3, pp. 217-231, 2001), (David Cournapeau, Tatsuya Kawahara, Kenji Mase, and Tomoji Toriyama, "Voice activity detector based on enhanced cumulant of LPC residual and on-line EM algorithm," in Proc. of INTERSPEECH, Pittsburgh, Pa., USA, 2006), and (David Cournapeau and Tatsuya Kawahara, "Evaluation of real-time voice activity detection based on high order statistics," in Proc. of INTERSPEECH, Antwerp, Belgium, 2007).

Typically, the kurtosis is applied to the residual signal after linear predictive coding (LPC) analysis. In contrast, turning back to FIG. 2, embodiments disclosed herein, such as an embodiment of the kurtosis feature module 208, apply the kurtosis feature directly to the electronic representation of the input audio signal 201' x(n), that may be a pre-emphasized or non-pre-emphasized input audio signal, to detect presence of desired speech.

According to embodiments disclosed herein, a time-dependent estimate of the kurtosis feature may be determined, such as by the kurtosis feature module 208, by:

$$kurt(\ell) = \frac{m_4(\ell \cdot R)}{(m_2(\ell \cdot R))^2} - 3, \quad (2)$$

where downsampling by a factor R may be applied to align the feature with the l-th frame used for block processing. Moments of 2nd and 4th order, that is, $m_2(n)$ and $m_4(n)$, respectively, may be estimated by the kurtosis feature module 208 using recursive smoothing with a smoothing constant $\alpha_k$:

$$m_2(n) = (1-\alpha_k) \cdot x^2(n) + \alpha_k \cdot m_2(n-1). \quad (3)$$

Analogously, $m_4(n)$ may be computed by smoothing $x^4(n)$.

The kurtosis may be smoothed again by the kurtosis feature module 208 using moving averaging $$\overline{kurt(\ell)} = \frac{1}{L_p + L_f + 1} \sum_{\tilde{\ell}=-L_p}^{L_f} kurt(\ell + \tilde{\ell}) \quad (4)$$

with a look-ahead $L_f$ to capture speech onsets. As such, the kurtosis feature module 208 may be configured to produce the kurtosis feature 232, according to Equations 2, 3, and 4, disclosed above.

Figure 3A:
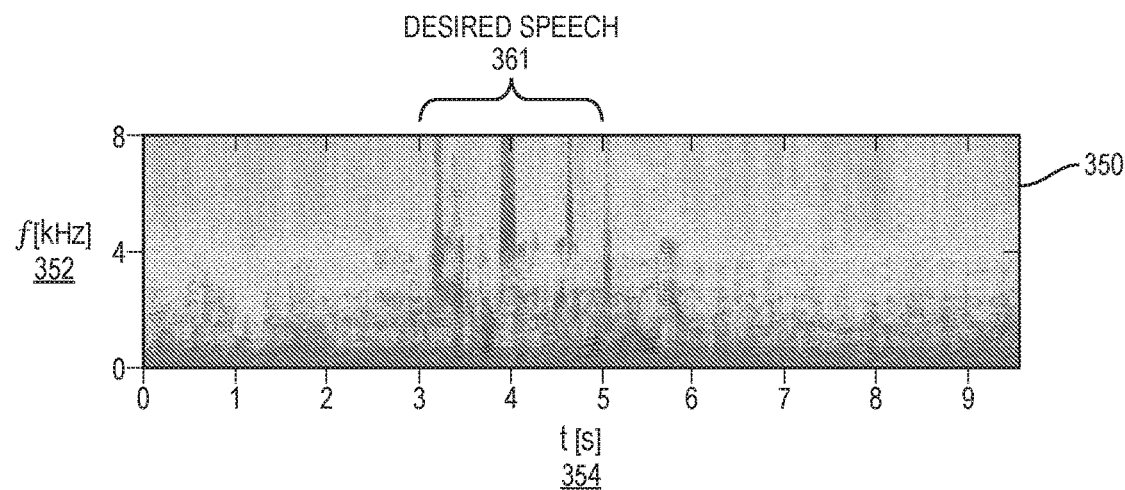
FIG. 3A is a graph of an example embodiment of frequency components over time of a spectrum of an audio signal including a Texas Instruments/Massachusetts Institute of Technology (TIMIT) utterance.

FIG. 3A is a graph 350 of an example embodiment of frequency components over time of a speech spectrum of an audio signal including a Texas Instruments/Massachusetts Institute of Technology (TIMIT) utterance. The graph 350 includes frequency components f[kHz] 352 for the audio signal over time t[s] 354. In the example embodiment, the TIMIT utterance is: "She had your dark suit in greasy wash water all year." The TIMIT utterance is indicative of the desired speech, such as the foreground speech components 103 of FIG. 1, disclosed above. In the example embodiment of FIG. 3A, a sampling rate of 16 kHz and a downsampling factor of R=256 were utilized to produce the frequency components, f[kHz] 352 of FIG. 3A.

Figure 3B:
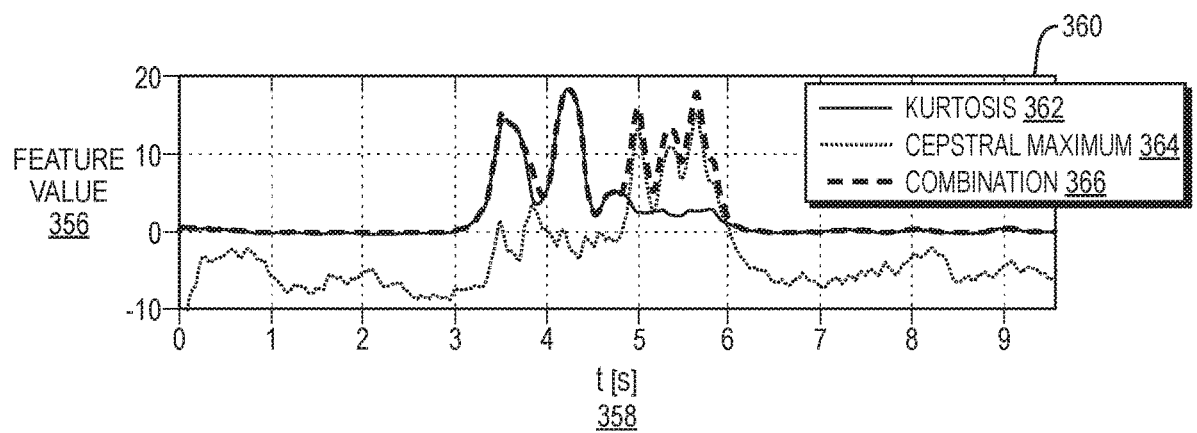
FIG. 3B is a graph of an example embodiment of simulated kurtosis feature values over time for the same TIMIT utterance used for generating the graph of FIG. 3A.

FIG. 3B is a graph 360 of an example embodiment of simulated feature values 356 over time t[s] 358 for the same TIMIT utterance used for generating the graph 350 of FIG. 3A, with smoothing constants of $\alpha_k$=0.9986≙−100 dB/s and $L_p$=$L_f$=10 frames≙160 ms. The simulated feature values 356 include simulated kurtosis features values 362 that are based on the kurtosis feature alone and resulted in most of the desired speech 361 of FIG. 3A being detected as shown in FIG. 3B. However, in a few cases, low frequency vowels, such as "/u/," were missed. As such, embodiments disclosed herein may employ an additional feature that may reflect, explicitly, the voiced excitation of human speech, such as the cepstral maximum feature 234 produced by the cepstral maximum feature module 210 of FIG. 2. The simulated feature values 356 include simulated cepstral maximum feature values 364 as well as simulated combination feature values 366 that are based on a combination of the kurtosis and cepstral maximum features. As shown in FIG. 3B, the simulated combination feature values 366 yielded the highest amount of the desired speech 361 of FIG. 3A. As such, according to embodiments disclosed herein, a speech detection feature based on kurtosis is capable of distinguishing between desired speech and babble noise and further improvement for the distinguishing may be achieved by smoothing the kurtosis and/or combining the kurtosis or smoothed kurtosis with a complementing feature, such as the cepstral maximum feature, disclosed in more detail below, or any other suitable feature that reflects the presence of speech.

B. Cepstral Maximum

As disclosed above, voiced speech components by multiple speakers overlap in the babble noise. Compared to clean speech, less distinct harmonic structures are, therefore, observable in a mixture of clean speech and babble noise. To complement the kurtosis, embodiments disclosed herein may exploit a cepstrum that reflects voiced components. According to embodiments disclosed herein, cepstral coefficients cepst(τ,l) may be determined, where τ denotes the cepstral coefficient index and denotes the l-th frame. The cepstral coefficients cepst(τ,l) may be determined by the cepstral maximum feature module 210 of FIG. 2, for example, by applying an Inverse Discrete Fourier Transform (IDFT) to log(Φxx(k,l)/Φbb(k,l)), where k addresses the frequency bin of the l-th frame of the noisy speech spectrum Φ(k,l) and the estimated noise spectrum $\hat{\Phi}_{bb}$(k,l) of the noisy speech spectrum $\Phi_{xx}$(k,l). The noisy speech spectrum $\Phi_{xx}$(k,l) may be referred to interchangeably herein as the power spectral density. According to embodiments disclosed herein, the noisy speech spectrum $\Phi_{xx}$(k,l) may be estimated by smoothing, temporally, the magnitude squared Short- Term Fourier Transform STFT coefficients $|X(k,l)|^2$. Normalization with the estimated noise spectrum $\hat{\Phi}_{bb}(k,l)$ may emphasize the harmonic structure.

For example, the system 202 of FIG. 2 may further comprise an STFT module 224 and a spectrum estimator 228. The STFT module 224 may be configured to transform blocks of the electronic representation of the input audio signal 201' x(n) in a time domain into a representation in a frequency domain, that is, the STFT coefficients X(k,l) 226.

The STFT coefficients X(k,l) 226 may be input to the spectrum estimator 228 that may estimate the power spectral density $\Phi_{xx}(k,l)$ by smoothing, temporally, the magnitude squared STFT coefficients 226. As such, the spectrum estimator 228 may be configured to estimate a power spectrum of the electronic representation of the input audio signal 201' x(n) based on a transformation of the electronic representation of the input audio signal 201' from the time domain to the frequency domain. The STFT coefficients X(k,l) 226 determined by the STFT module 224 may be further input to a noise shaper 220 and multiplicative element 253, as disclosed further below.

The power spectral density $\Phi_{xx}(k,l)$ may be input as the power spectral density $\Phi_{xx}(k, l)$ 230a to the cepstral maximum feature module 210 for determining the cepstral coefficients cepst($\tau$,l) (not shown) disclosed above. The power spectral density $\Phi_{xx}(k,l)$ may be further input as the power spectral density $\Phi_{xx}(k,l)$ 230b to a noise estimator 236 that may be configured to estimate the power spectral density of the noise, that is, the estimated noise spectrum $\hat{\Phi}_{bb}(k,l)$ 238, based on the estimated power spectral density $\Phi_{xx}(k,l)$ 230b of the noisy input speech signal as estimated by the spectrum estimator 228. The power spectral density $\Phi_{xx}(k,l)$ 230b may be further input to a Wiener filter 221, as disclosed further below in the Noise Suppression section. It should be understood that the power spectral density $\Phi_{xx}(k,l)$ 230a and the power spectral density $\Phi_{xx}(k,l)$ 230b are the same power spectral density $\Phi_{xx}(k,l)$ determined by the spectrum estimator 228.

In FIG. 2, the estimated noise spectrum $\hat{\Phi}_{bb}(k,l)$ 238 is not shown as an input to the cepstral maximum feature module 210 for simplicity; however, the estimated noise spectrum $\hat{\Phi}_{bb}(k,l)$ 238 may be used by the cepstral maximum feature module 210 for determining the cepstral coefficients cepst ($\tau$,l). According to embodiments disclosed herein, the cepstral maximum feature module 210 may be configured to accumulate neighboring bins of the cepstrum by:

$$\overline{cepst}(\tau, \ell) = \frac{1}{3 \cdot 4} \sum_{\tilde{\tau}=-1}^{1} \sum_{\tilde{\ell}=-3}^{0} cepst(\tau + \tilde{\tau}, \ell + \tilde{\ell}) \quad (5)$$

before the maximum in the relevant region between 60 Hz and 300 Hz is searched $$voicing(\ell) = \max_{\tau}(\overline{cepst}(\tau, \ell)) - voicing_{offset}. \quad (6)$$

An offset may be removed by the cepstral maximum feature module 210 by subtracting an offset parameter voicing$_{offset}$, according to Equation 6, disclosed above. Finally, to produce the cepstral maximum feature 234, the cepstral maximum feature module 210 may be configured to smooth the maximum value, temporally, by:

$$\overline{voicing}(l) = (1-\alpha_v) \cdot voicing(l) + \alpha_v \cdot \overline{voicing}(l-1). \quad (7)$$

An example embodiment of the cepstral maximum feature 234 of FIG. 2 is shown as the simulated cepstral maximum feature values 364 of FIG. 3B, disclosed above. In the example embodiment of FIG. 3B, the STFT module 224 was employed with a Hann window of length 512 samples to determine the STFT coefficients X(k,l) 226 of FIG. 2. The estimated noise spectrum $\hat{\Phi}_{bb}(k,l)$ 238 was computed by smoothing $\Phi_{xx}(k,l)$ 230a=$\Phi_{xx}(k, 1)$ 230b when the soft speech detector 204 produced a speech detection result 212 indicating a high likelihood of absence of speech, that is, a high probability that speech is not present. In the presence of speech, that is, when the soft speech detector 204 produced the speech detection result 212 indicating a high probability of the presence of speech, the noise estimate $\hat{\Phi}_{bb}(k,l)$ 238 was not updated. The offset parameter, voicing$_{offset}$, disclosed above, was set=⅙ to achieve positive values only for distinct harmonic structures. Smoothing was performed with $\alpha_v = 0.9 \triangleq -30$ dB/s.

C. Combination and Detection Results

In the example embodiment of FIG. 2, the kurtosis feature 232 and the cepstral maximum feature 234 are combined by a combiner 206 to produce the speech detection result 212. According to embodiments disclosed herein, the combiner 206 may combine the kurtosis feature 232 and the cepstral maximum feature 234 using a weighted sum:

$$comb(l) = w_k \cdot \max(0, \overline{kurt}(l)) + w_v \cdot \max(0, \overline{voicing}(l)) \quad (8)$$

with $w_k=1$ and $w_v=96$. According to one embodiment, only positive values of the kurtosis feature 232 and cepstral maximum feature 234 may be considered to prevent from negative contributions.

Turning again to FIG. 3B, the combination of both features is shown as the simulated combination feature values 366 that may represent the speech detection result 212 of FIG. 2.

Analyses with artificially mixed data from TIMIT (John S. Garofolo, Lori F. Lamel, William M. Fisher, Jonathan G. Fiscus, David S. Pallet, and Nancy L. Dahlgren, "DARPA TIMIT Acoustic-Phonetic Continuous Speech Corpus CD-ROM," 1993) and NOISEX-92 (Andrew Varga and Herman J. M. Steeneken, "Assessment for automatic speech recognition: II. NOISEX-92: A database and an experiment to study the effect of additive noise on speech recognition systems," Speech Communication, vol. 12, no. 3, pp. 247-251, 1993) database were performed. Signal-to-noise power ratios (SNRs) in a range between 0 and 10 dB were chosen. A good detection performance for the kurtosis feature is observable from the kurtosis feature Receiver Operating Characteristic (ROC) curve 404 shown in FIG. 4, disclosed below. For example, high detection rates of the detection rates P$_d$ 406 can be achieved with relatively low false-alarm rates of the false-alarm rates P$_{fa}$ 408 as shown.

Figure 4:
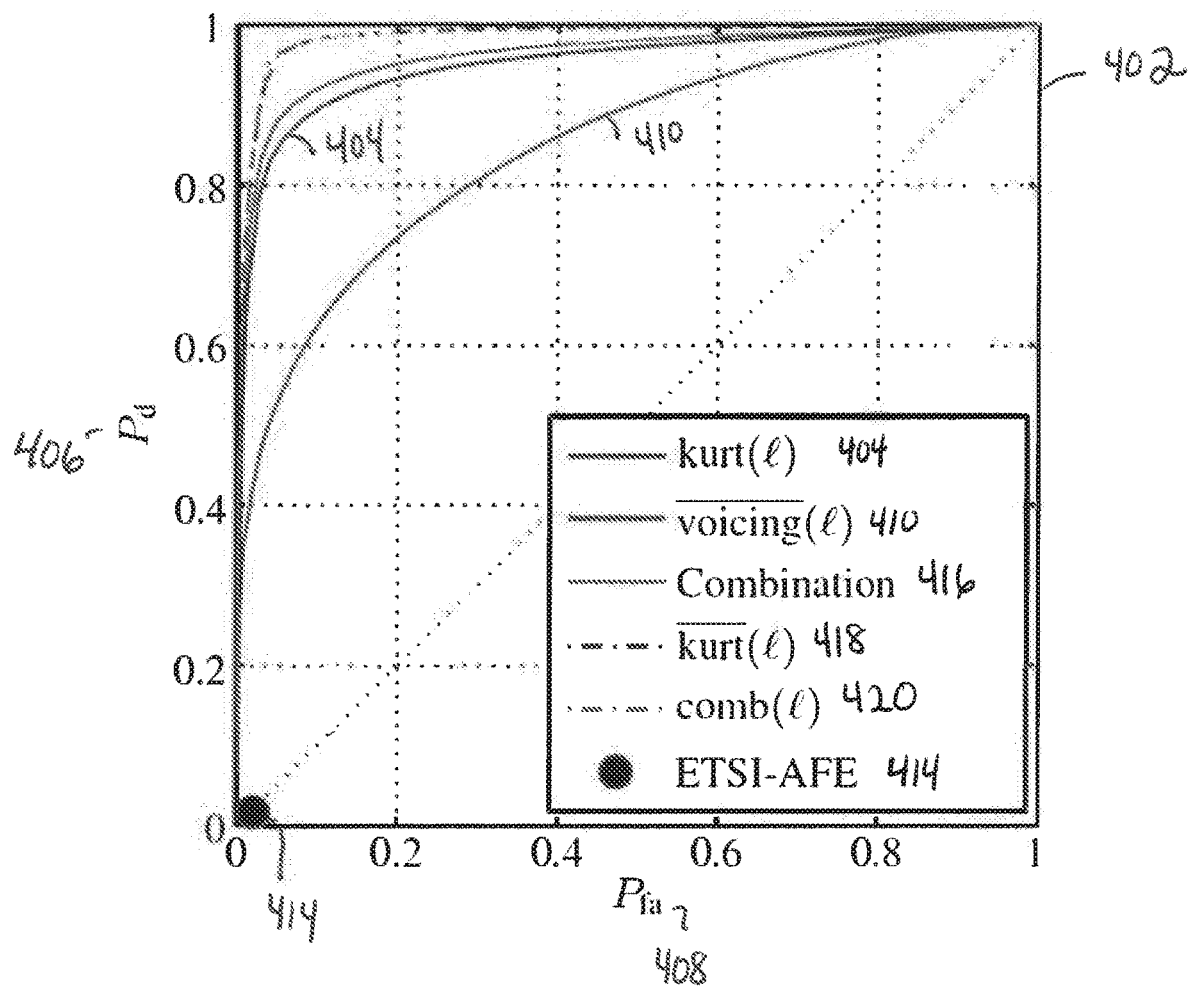
FIG. 4 is a block diagram of an example embodiment of a graph with Receiver Operating Characteristic (ROC) curves.

FIG. 4 is a block diagram 400 of an example embodiment of a graph 402 with Receiver Operating Characteristic (ROC) curves. The cepstral maximum feature ROC curve 410 that may be computed according to Equation 7, disclosed above, shows a lower performance than the kurtosis feature ROC curve 404 that may be computed according to Equation 2, disclosed above, since the cepstrum only detects voiced speech portions. Furthermore, harmonic components in the babble noise sometimes falsely trigger the cepstral maximum feature.

According to embodiments disclosed herein, performance improvements can be achieved by combining both features, as shown by the combined feature ROC curve 416 and performance can be further improved by combining both features and applying a smoothing to the kurtosis, as shown by the combination feature with kurtosis smoothing ROC curve 420. For example, smoothing the kurtosis, according to Equation 4, disclosed above, yields the smoothed kurtosis feature ROC curve 418. Combining both features and applying a smoothing to the kurtosis according to Equation 8, disclosed above, yields the combination feature with kurtosis smoothing ROC curve 420 that results in the highest detection rates of the detection rates $P_d$ 406 with the lowest false-alarm rates of the false-alarm rates $P_{fa}$ 408. For comparison, the operating point 414 of the established speech detector ETSI-AFE (ETSI, "ETSI standard 202 050 v1.1.5: Advanced front-end feature extraction algorithm," 2007) is plotted. With the database, this detector is almost never triggered resulting in both $P_d \approx P_{fa} \approx 0$ as shown by the data point 414. This observation underlines the challenge of speech detection in babble noise.

Noise Suppression

Turning back to FIG. 2, according to embodiments disclosed herein, the noise suppressor 214 of FIG. 2 may perform noise suppression and the noise suppression may include a strong attenuation that is applied during speech pauses by overestimating the noise, dynamically. The noise suppressor 214 may include an overestimator 250 that is configured to produce an overestimation factor $\beta_{oe}(l)$ 216 to control the aggressiveness of noise suppression. As such, the noise suppressor 214 may be configured to compute, dynamically, the dynamic noise overestimation factor $\beta_{oe}(l)$ 216 based on the speech detection result 212 determined.

For example, the noise suppressor 214 may be further configured to determine periods of speech pauses and periods of speech activity in the electronic representation of the input audio signal 201' as a function of the speech detection result 212 determined. The overestimation factor $\beta_{oe}(l)$ 216 may be computed by the overestimator 250 based on the combined speech detection result 212 according to Equation 11, disclosed further below.

As disclosed above, the noise suppressor 214 may include the wiener filter 221. The Wiener filter 221 may be configured to produce spectral weighting coefficients $H_{wf}(k,l)$ 241 according to:

$$H_{WF}(k,\ell) = 1 - \frac{\beta_{oe}(\ell) \cdot \hat{\Phi}_{bb}(k,\ell)}{\Phi_{xx}(k,\ell)}, \qquad (9)$$

where the power spectral density $\Phi_{xx}(k,l)$ 230b from the spectrum estimator 228 is represented in the denominator. The noise suppressor 214 may include a first multiplicative element 251 configured to apply the overestimation factor $\beta_{oe}(l)$ 216, that may be a scalar, to the estimated power spectral density (PSD) of the noise, that is the estimated noise spectrum $\hat{\Phi}_{bb}(k,l)$ 238, to produce the numerator of Equation 9, disclosed above, that is, the overestimated power spectral density of the noise 239 of FIG. 2. As such, the overestimation factor $\beta_{oe}(l)$ 216 may be computed by the overestimator 250 based on the combined speech detection result 212 and applied to the estimated noise power spectral density $\hat{\Phi}_{bb}(k,l)$ 238 by employing the first multiplicative element 251. In Equation 9, disclosed above, all variables may be scalars; however, the overestimation factor $\beta_{oe}(l)$ is not frequency-dependent as it depends only on T. In contrast, the power spectral density (PSD) $\Phi_{xx}(k,l)$ depends on both frequency (k) and frame (l). As such, for a frame l, the same overestimation factor $\beta_{oe}(l)$ is, therefore, applied to all frequency bins (k) of the PSD $\Phi_{xx}(k,l)$.

The spectral weighting coefficients $H_{wf}(k,l)$ 241 may be computed according to the Wiener filter (Equation 9) based on the estimated power spectral density of the noisy speech signal $\Phi_{xx}(k,l)$ 230b and the overestimated power spectral density of the noise 239. According to embodiments disclosed herein, increasing the value of the dynamic noise overestimation factor $\beta_{oe}(l)$ 216 enables the spectral weighting coefficients computed, that is $H_{wf}(k,l)$ 241, to increase suppression of the background noise relative to an amount of suppression of the background noise for the periods of speech activity determined. Without overestimation, ($\beta_{oe}(l)$ =1), the Wiener filter 221 corresponds to a classical Wiener characteristic. According to embodiments disclosed herein, the spectral weighting coefficients $H_{wf}(k,l)$ 241 may be input to the noise shaper 220, disclosed above. The noise shaper 220 may apply a dynamic floor to the spectral weighting coefficients $H_{wf}(k,l)$ 241 that reduces the non-stationary noise in the noisy speech signal.

A dynamic floor shapes the residual noise (Vasudev Kandade Rajan, Christin Baasch, Mohamed Krini, and Gerhard Schmidt, "Improvement in Listener Comfort Through Noise Shaping Using a Modified Wiener Filter Approach," in *Proc. of* 11. *ITG Symposium on Speech Communication*, Erlangen, Germany, 2014)

$$H_{NS}(k,l) = \max(H_{floor}(k,l), H_{WF}(k,l)) \qquad (10)$$

to achieve a more stationary output signal. Classical noise suppression methods employ a fixed floor $H_{floor}(k,l) = H_{floor, fixed}$ instead.

According to embodiments disclosed herein, the overestimation factor $\beta_{oe}(l)$ 216 may be computed based on the speech detection result 212, that is, the combined speech detection feature comb(l), according to:

$$\beta_{oe}(\ell) = \min\left(\beta_{max}, \frac{1}{comb(\ell)+\epsilon}+1\right) \qquad (11)$$

and applied to the estimated noise spectrum $\hat{\Phi}_{bb}(k,l)$ 238 according to Equation 9, disclosed above. During speech pauses indicated by the combined speech detection result 212 (e.g., comb (l)≈0), high noise overestimation may be applied with a maximal factor $\beta_{max}=21$. High values of the feature that indicates presence of speech results in a reduced overestimation factor $\beta_{oe}(l) \approx 1$. This kurtosis-based control prevents speech distortions caused by too aggressive attenuation during presence of speech.

As such, according to Equations 9 and 11, disclosed above, speech detection features may be employed to control aggressiveness of noise suppression and protect the desired speech by reducing, dynamically, the aggressiveness with more aggressive attenuation applied to the non-stationary noise components. Further, according to Equations 10 and 12, disclosed above, combination with reduction of non-stationary components by selectively lowering the maximal attenuation $H_{floor}(k,l)$ yields a more stationary output in addition to the more aggressive attenuation.

FIG. 5A is an example embodiment of a spectrogram 502a for an unprocessed noisy input signal. FIG. 5B, FIG. 5C, and FIG. 5D are example embodiments of spectrograms 502b, 502c, and 502d, respectively, showing improvements for babble noise suppression of the unprocessed noisy input signal according to example embodiments disclosed herein.

FIG. 5B is an example embodiment of a spectrogram 502b showing improvement to the babble noise suppression of FIG. 5A by processing the unprocessed noisy input signal of FIG. 5A with a Wiener filter without overestimation and with a fixed floor. The spectrogram 502b may show that stationary noise is reduced; however, the spectrogram 502*b* shows strong non-stationary artifacts, that is, non-stationary components remain. These artifacts are reduced by the dynamic overestimation as shown in the spectrogram 502*c* of FIG. 5C, disclosed below.

FIG. 5C is an example embodiment of a spectrogram 502*c* showing further improvement of the babble noise suppression that is achieved by processing the unprocessed noisy input signal of FIG. 5A with a Wiener filter as in FIG. 5B and with dynamic noise overestimation, as disclosed above. FIG. 5D shows further improvement to the quality of the unprocessed noisy input signal of FIG. 5A, as disclosed below.

Remaining non-stationary components can be further reduced by selectively lowering the noise floor $$H_{floor}(k, \ell) = H_{floor,fixed} \cdot \min\left(1, \left(\frac{X_{desired}(k, \ell)}{|X(k, \ell)|}\right)^c\right) \quad (12)$$

for the corresponding frequencies (Vasudev Kandade Rajan, Christin Baasch, Mohamed Krini, and Gerhard Schmidt, "Improvement in Listener Comfort Through Noise Shaping Using a Modified Wiener Filter Approach," in *Proc. of* 11. *ITG* Symposium on Speech Communication, Erlangen, Germany, 2014). For this noise shaping, the ratio between a desired magnitude $X_{desired}(k,l)$ and the current magnitudes of the noisy STFT bins $|X(k,l)|$ is determined. Attenuating by this factor results in a more stationary background noise. The stationarity of the result can be controlled by adjusting the exponential term c. For c=0, no noise shaping is applied, whereas for c=1 the non-stationary characteristic is completely removed. As a trade-off, embodiments disclosed herein may choose c=0.5 to reduce the non-stationary components but preserve a naturally sounding background noise. According to embodiments disclosed herein, the desired shape may be computed based on the estimated noise spectrum averaged over time:

$$X_{desired}(k,l) = \sqrt{\Phi_{bb,average}(k,l)_+}$$

According to embodiments disclosed herein, the noise suppressor 214 may be further configured to compute, dynamically, a dynamic noise floor, and selectively lower the dynamic noise floor based on frequencies corresponding to the non-stationary noise components. The noise shaper 220 may apply the dynamic noise floor to the spectral weighting coefficients $H_{wf}(k,l)$ 241 that may reduce the non-stationary noise. The spectral weighting coefficients may be computed further based on the dynamic noise floor computed and selectively lowered to produce the modified spectral weighting coefficients after noise shaping 243 that are input to the post-processor 222.

Alternatively, residual non-stationary noise components may be identified relying on contextual information from neighboring coefficients. Spectral weighting coefficients corresponding to the residual non-stationary noise components may be set to a lower value, such as a fixed noise floor or a dynamic noise floor.

The post-processor 222 may modify the spectral weighting coefficients after noise shaping 243 according to Equation 13, disclosed below. According to embodiments disclosed herein, sporadically occurring musical tones may be finally removed by the post-processor 222. According to Equation 13, disclosed below, the post-processor 222 may modify the spectral weighting coefficients after noise shaping 243 to produce the final spectral weighting coefficients H(k,l) 245. Spectral weighting coefficients H(k,l) 245 that exceed the fixed noise floor may be set to the dynamic floor $$H(k, \ell) = \begin{cases} H_{floor}(k, \ell) & \text{if } H_{NS}(k, \ell) > H_{floor,fixed} \wedge n_-(k, \ell) > \\ & \quad 1.5 \cdot n_+(k, \ell) \\ H_{NS}(k, \ell) & \text{else} \end{cases} \quad (13)$$

in an event a majority of coefficients in neighboring frequencies attenuates the spectrum to the dynamic floor. For example, a majority of neighboring coefficients has to attenuate stronger than the fixed floor to overrule the original weighting coefficient, that is, a given one of the modified spectral weighting coefficients 243. For this, a first number $n_-(k,l)$ of coefficients next to k that attenuate stronger than the fixed floor may be compared to a second number of coefficients $n_+(k,l)$ that exceed the fixed floor. As such, the noise suppressor 214 may be further configured to identify one or more spectral weighting coefficients from the spectral weighting coefficients computed based on contextual information from neighboring spectral weighting coefficients. Neighboring spectral coefficients may be some spectral coefficients in frequency bins k or frames l that are close to a current spectral coefficient, such as in a given range of bins or frames from an associated bin or frame of the current spectral coefficient. The noise suppressor 214 may be further configured to post-process the spectral weighting coefficients computed by setting first values computed for the one or more spectral weighting coefficients identified to second values, the second values enabling a stronger attenuation of the background noise than the first values.

As such, post-processing of the modified spectral weighting coefficients 243 may employ contextual information from neighboring frequency bins to produce the final spectral weighting coefficients H(k,l) 245 that may be considered as corrected spectral weighting coefficients. The final spectral weighting coefficients H(k,l) 245 may include spectral weighting coefficients associated with a particular kth bin and fth frame that may be set to the maximal attenuation when the majority of neighboring bins are set to the maximal attenuation.

The system 202 may further include a second multiplicative element 253 that applies the final spectral weighting coefficients H(k,l) 245 after noise shaping by the noise shaper 220 and post-processing by the post-processor 222 to the noisy STFT coefficients X(k,l) 226 and generates the enhanced STFT coefficients Y(k,l) 247. The second multiplicative element 253 may perform an element-wise multiplication of two vectors that represent the final spectral weighting coefficients H(k,l) 245 and the noisy STFT coefficients X(k,l) 226 to generate the enhanced STFT coefficients Y(k,l) 247. The system 202 may further include the overlap add module 249 that may be configured to convert (i.e., transform) the enhanced STFT coefficients Y(k,l) 247 into the time-domain electronic representation of the output audio signal 215′.

FIG. 5D is an example embodiment of a spectrogram 502*d* showing further improvement of the babble noise suppression that is achieved by processing the unprocessed noisy input signal of FIG. 5A with a Wiener filter with dynamic noise overestimation as in FIG. 5C, and by applying the noise shaping and post-processing disclosed above.

The spectrogram 502*d* includes all of the processing features of a babble noise suppression system according to embodiments disclosed herein. According to embodiments disclosed herein, in the presence of the desired speech (i.e., 1.5 s-4 s in the example embodiment), the babble noise suppression acts less aggressively to prevent from speech distortions. A more stationary background is achieved which is expected to be more comfortable for human listeners. In order to evaluate the improvements that are achieved by the babble noise suppression system according to embodiments disclosed herein, a subjective listening test was conducted. In the following, the test results are summarized.

Results

To evaluate the methods disclosed herein, a subjective listening test and objective measure were employed.

To evaluate the quality of the remaining noise as perceived by human listeners, a subjective listening test was conducted. In a multi-stimulus test, similar to MUSHRA (ITU, "Recommendation ITU-R B S.1534-3: Method for the subjective assessment of intermediate quality level of audio systems," 2015), 21 test subjects rated an acceptability of background noise for four processing variants of a signal. The subjects were asked to decide whether they perceived the noise in the variants as more or less pleasant than the noise in a reference.

Figure 6A:
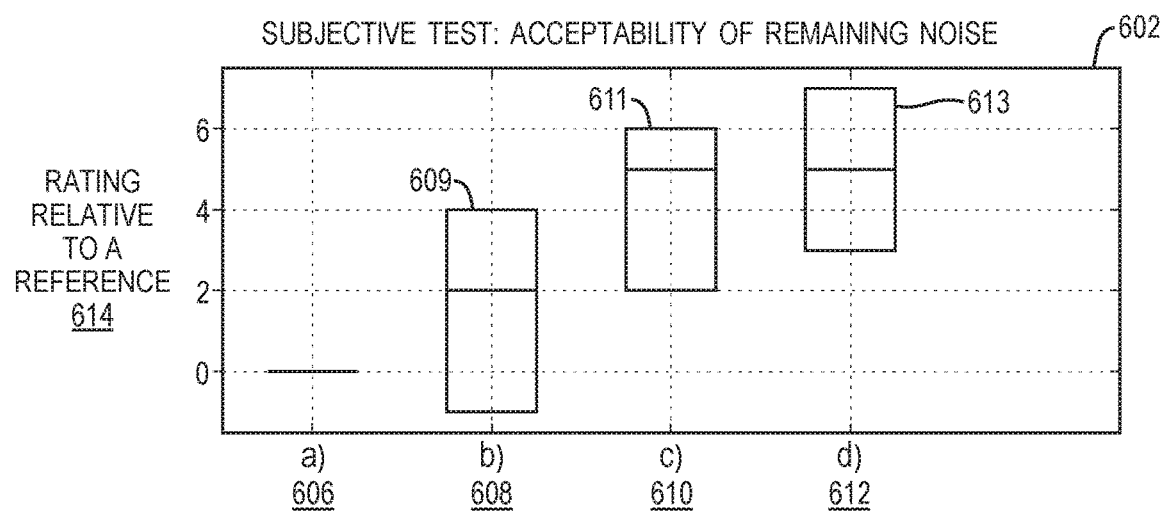
FIG. 6A is a graph including results of a subjective listening test.

FIG. 6A is a graph 602 including results of the subjective listening test. In the subjective listening test, a noisy speech signal was presented as the reference that was repeated as a hidden reference shown in (a) 606. In FIG. 6A, results for variants of the signal that were presented are shown. The variants of the signal included: (i) the signal processed with a standard Wiener filter (b) 608, (ii) the signal processed a Wiener filter with dynamic noise overestimation (c) 610, and (iii) the signal processed with the Wiener filter with dynamic noise overestimation, noise shaping, and post-processing (d) 613. The test was repeated for 10 different signals, including artificially mixed signals, as well as real recordings. The acceptability of the remaining background noise was rated on a scale from −10 (less pleasant) to 10 (more pleasant) as shown by the rating 614 that is a rating relative to the reference (a) 606.

The median, as well as the 25% and 75% quantiles over all answers are depicted in the boxplots 609, 611, and 613 for each signal variant (b) 608, (c) 610, and (d) 612, respectively. Almost all subjects correctly identified the hidden reference 606 (a) and rated the signal as "equal" (zero). Wiener filtering 608 (b) already increased the acceptability of the background noise for most subjects; however, some subjects preferred the unprocessed signals. Significant improvements were achieved by dynamic noise overestimation 610 (c). Noise shaping and post-processing 612 (d) slightly increased the acceptability.

According to embodiments disclosed herein, the noise suppression may be designed to act less aggressively in presence of speech. However, small speech distortions may be unavoidable when the signal is processed. In order to evaluate the speech distortions that are introduced by the system, an objective measure may be employed. For artificially mixed signals, the distortions between the clean speech signal and the processed speech component may be determined.

Figure 6B:
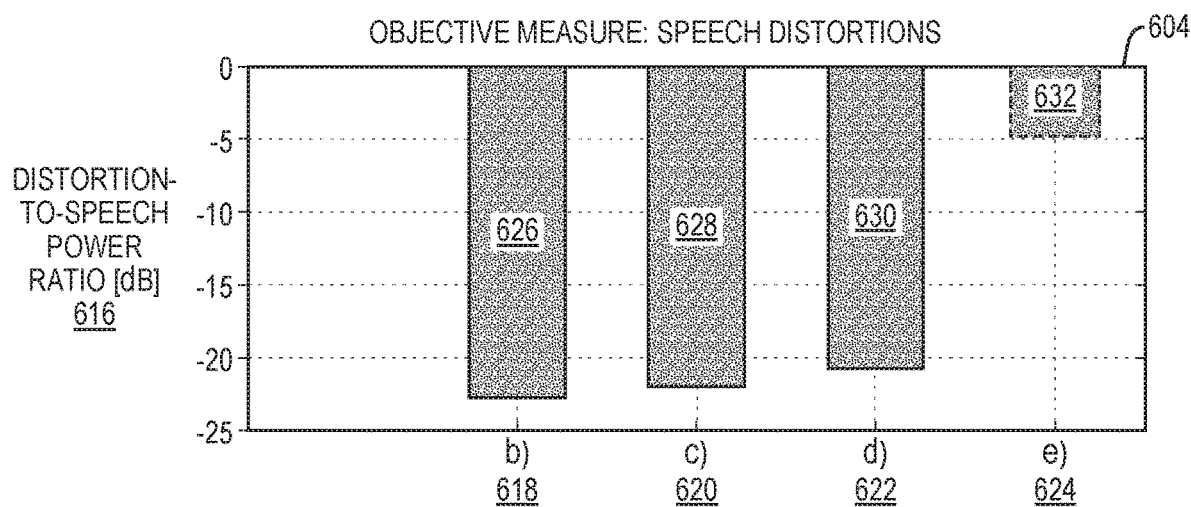
FIG. 6B is a graph with an objective measure.

FIG. 6B is a graph 604 with such an objective measure. The graph 604 shows an example embodiment of distortion-to-speech power ratios 616 for different signal processing variants (b) 618, (c) 620, and (d) 622, that correspond to the signal processing variants (b) 608, (c) 610, and (d) 612 of the graph 602 of FIG. 6A, respectively. Distortion-to-speech power ratio results 626, 628, and 630 are shown for each signal variant (b) 618, (c) 620, and (d) 622, respectively. A worst case reference (e) 624 is also shown that depicts the distortion-to-speech power ratio results 632 for a fixed noise overestimation $\beta_{oe}(l)=\beta_{max}$.

As shown in the graph 604 of FIG. 6B, the Wiener filter without noise overestimation 618 introduces small distortions in the range of 23 dB. Only 2 dB of additional speech distortions are introduced by applying the dynamic noise overestimation with noise shaping and post-processing according to embodiments disclosed herein. These processing features, however, significantly improved the acceptability of the background noise, as confirmed by the subjective listening tests, disclosed above. For comparison, a fixed overestimation by $\beta_{max}=21$ introduces high speech distortions in the range of −5 dB.

According to embodiments disclosed herein, a babble noise suppression system is introduced that may include a soft speech detector that may be employed to distinguish between babble noise and desired speech. Simulation results disclosed herein show that a kurtosis measure achieves good detection results and that further improvements may be achieved by smoothing the kurtosis and combining the smoothed kurtosis with at least one other feature.

According to embodiments disclosed herein, noise suppression may be controlled in a system based on a combined speech detection result. Noise may be suppressed more aggressively when no speech is detected. Noise shaping may be applied to achieve a more stationary background in the output signal. In addition, remaining musical tones may be reduced by modifying the spectral weighting coefficients.

Subjective listening tests confirmed that a system, according to embodiments disclosed herein, reduces the babble noise, effectively. The background noise in the processed signals was mostly perceived as more pleasant compared to an unprocessed reference. Further, the system introduces only little speech distortions as verified by an objective measure, as disclosed above.

Turning back to FIGS. 1 and 2, the systems 102 and 202 may further comprise a pre-processing unit (not shown). The pre-processing unit may be configured to pre-process the electronic representation of the input audio signal 101' or 201' to pre-emphasize spectral characteristics of the electronic representation of the input audio signal 101' or 201'. The soft speech detector 104 or 204 and the noise suppressor 114 or 214, respectively, may be further configured to determine and compute, respectively, for a given time interval of the pre-processed electronic representation of the input audio signal 101' or 201'. The noise suppressor 114 or 214 may be further configured to apply the spectral weighting coefficients computed to the pre-processed audio signal in the given time interval.

Figure 7:
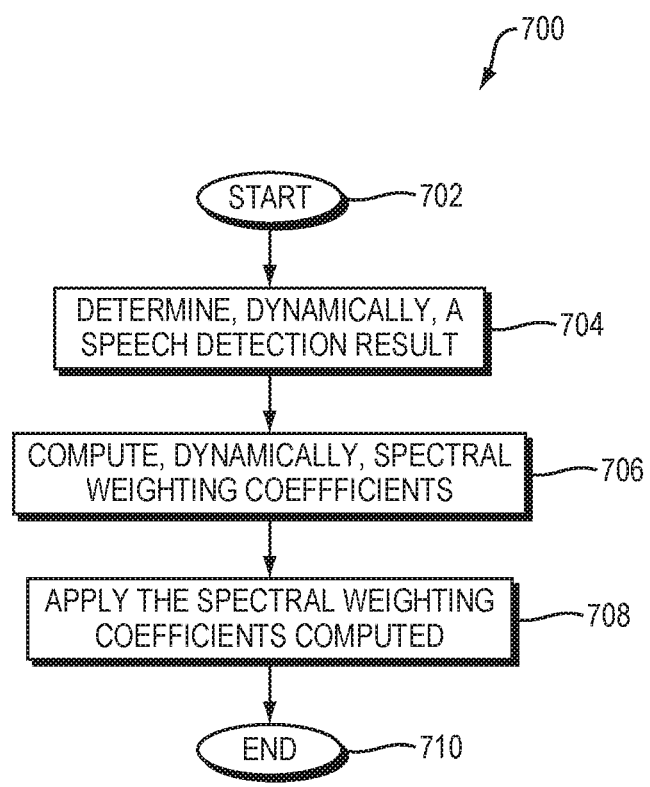
FIG. 7 is a flow diagram of an example embodiment of a method of performing noise suppression of an audio signal.

FIG. 7 is a flow diagram 700 of an example embodiment of a method of performing noise suppression of an audio signal. The audio signal may include foreground speech components and background noise, such as the foreground speech components 103 and background noise 105 of FIG. 1, disclosed above. The method may begin (702) and determine, dynamically, a speech detection result indicating a likelihood of a presence of the foreground speech components in the audio signal (704). The method may compute, dynamically, spectral weighting coefficients based on the speech detection result determined (706) and apply the spectral weighting coefficients computed to the audio signal to suppress the background noise in a dynamic manner (708). The method thereafter ends (710), in the example embodiment.

Figure 8:
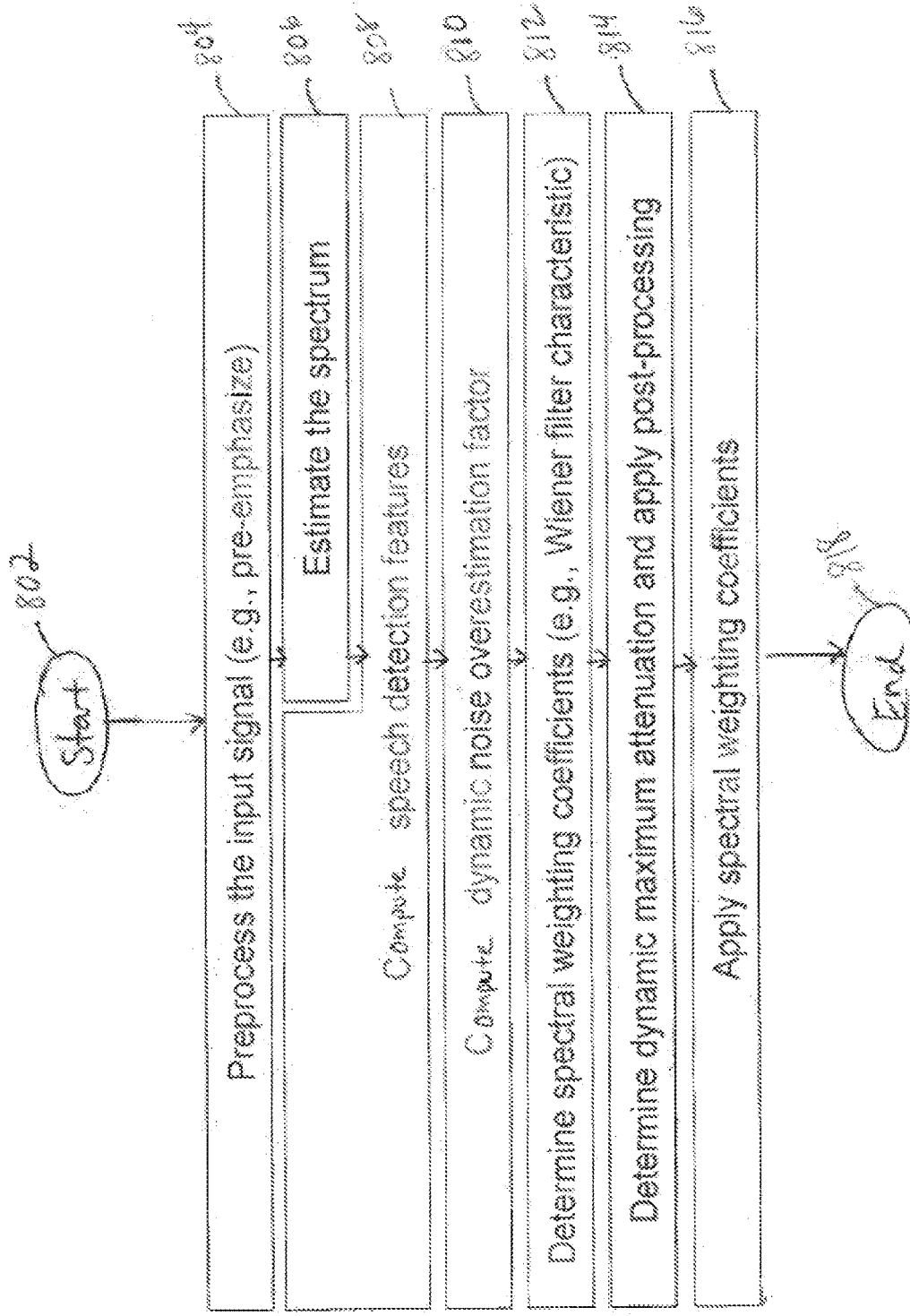
FIG. 8 is a flow diagram of another example embodiment of a method of performing noise suppression of an audio signal.

FIG. 8 is a flow diagram 800 of another example embodiment of a method of performing noise suppression of an audio signal. The method may begin (802) and pre-process the input signal (804). The method may estimate the spectrum (806) and compute speech detection features (808). According to embodiments disclosed herein, speech detection features may be employed to control aggressiveness, that is, a strength of attenuation, of noise suppression. Protection of desired speech may be achieved by reducing the aggressiveness. More aggressive attenuation of the non-stationary noise components may be applied via the overestimation factor of Equation 11 as applied in Equation 9, as disclosed above.

According to embodiments disclosed herein, a speech detection feature based on kurtosis may be used to distinguish between desired speech and babble noise. Further, embodiments disclosed herein may provide further improvement by smoothing and/or combining the kurtosis feature with a complementing feature, such as, the cepstral maximum feature, or any other suitable feature. The method may compute a dynamic noise overestimation factor (810) and determine spectral weighting coefficients (812). The method may determine a dynamic maximum attenuation and apply post-processing (814).

Combination with reduction of non-stationary components by selectively lowering the maximal attenuation may achieve a more stationary output in addition to the more aggressive attenuation as disclosed above, with reference to Equations 10 and 12. Post-processing of spectral weighting coefficients may employ contextual information from neighboring frequency bins to correct spectral weighting coefficients, as disclosed above. Embodiments disclosed herein may set a frequency bin to the maximal attenuation in an event the majority of neighboring bins is set to the maximal attenuation. The method may apply the spectral weighting coefficients (816) and the method thereafter ends (818) in the example embodiment.

As disclosed above, babble noise may be a severe problem in speech enhancement applications. This type of noise may include a composition of multiple background speech components and exhibit properties similar to the desired foreground speech. Embodiments disclosed herein improve suppression of non-stationary noise components, such as babble noise, whereas other noise reduction approaches primarily suppress the stationary background noise.

According to embodiments disclosed herein, a noise suppression system is introduced for a more aggressive attenuation of babble noise. The noise suppression system disclosed herein includes a speech detector for foreground speech which is robust against background speech. Embodiments disclosed herein distinguish between desired speech and interfering babble noise and introduce a babble noise suppression system that provides effective suppression of babble noise by employing speech detection information to control the noise suppression.

Since mobile devices, such as smartphones, are employed even in crowded environments, a strong need may be present for embodiments disclosed herein that may reduce babble noise in a cost effective manner. Automatic speech recognition can benefit from the improved speech enhancement or from meta-information on the presence of speech, such as the combined speech detection result.

According to some embodiments, the babble noise suppression described herein may comprise four stages:

Feature extraction and combination to distinguish between desired speech and interfering babble noise. As disclosed above, in order to detect desired foreground speech in the presence of babble noise, two features may be evaluated. Kurtosis reflects the sparseness of foreground speech by considering the distribution of sample values. The distribution of foreground speech is sparser than the distribution of babble noise in the background. Higher values of kurtosis, therefore, indicate the presence of desired speech. As disclosed above, the kurtosis feature may be applied directly to a pre-emphasized noisy input signal. In addition to kurtosis, another feature, such as the cepstral maximum, may be evaluated, for example, to capture harmonic speech components. According to embodiments disclosed herein, the combination of both features allows for a more accurate detection of desired speech compared to the single features.

Noise overestimation for stronger attenuation of noise in speech pauses. According to embodiments disclosed herein, using the combined value from both features, noise overestimation may be controlled. For example, during speech pauses, the noise spectrum may be overestimated resulting in a stronger attenuation of noise. The maximum attenuation, however, may be limited by a floor.

Noise floor modifications for more aggressive attenuation of non-stationary noise components. A fixed floor may result in the same attenuation for stationary and non-stationary noise components. As such, the non-stationary components still stick out of the stationary background in this case. According to embodiments disclosed herein, stationarization of non-stationary components may be achieved by applying a more aggressive attenuation to non-stationary components. For this, the noise floor may be selectively lowered for frequency bins that contain non-stationary interferences, as disclosed above.

Post processing of the spectral weighting coefficients to reduce the amount of noise in the result. According to embodiments disclosed herein, post processing may be applied to the spectral weighting coefficients that were determined with noise overestimation and noise floor modification. Open bins that are neighbored by attenuating bins may be set to the noise floor to reduce remaining musical noise components. The decision as to which bins are affected by this post processing may rely on a local majority vote, as disclosed above.

FIG. 9 is a block diagram of an example of the internal structure of a computer 900 in which various embodiments of the present disclosure may be implemented. The computer 900 contains a system bus 902, where a bus is a set of hardware lines used for data transfer among the components of a computer or processing system. The system bus 902 is essentially a shared conduit that connects different elements of a computer system (e.g., processor, disk storage, memory, input/output ports, network ports, etc.) that enables the transfer of information between the elements. Coupled to the system bus 902 is an I/O device interface 904 for connecting various input and output devices (e.g., keyboard, mouse, displays, printers, speakers, etc.) to the computer 900. A network interface 906 allows the computer 900 to connect to various other devices attached to a network. Memory 908 provides volatile storage for computer software instructions 910 and data 912 that may be used to implement embodiments of the present disclosure. Disk storage 914 provides non-volatile storage for computer software instructions 910 and data 912 that may be used to implement embodiments of the present disclosure. A central processor unit 918 is also coupled to the system bus 902 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 9, disclosed above, or equivalents thereof, firmware, a combination thereof, or other similar implementation determined in the future. For example, the soft speech detector 104 or 204 of FIGS. 1 and 2, respectively, and the as well as the noise suppressor 114 and 214 of FIGS. 1 and 2, respectively, and elements thereof, may be implemented in software or hardware, such as via one or more arrangements of circuitry of FIG. 9, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of non-transitory computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of performing noise suppression of an audio signal, the audio signal including foreground speech components and background noise, the method comprising: determining, dynamically, a speech detection result indicating a likelihood of a presence of the foreground speech components in the audio signal; and computing, dynamically, spectral weighting coefficients based on the speech detection result determined and applying the spectral weighting coefficients computed to the audio signal to suppress the background noise in a dynamic manner.

2. The method of claim 1, further comprising: computing, dynamically, a dynamic noise overestimation factor based on the speech detection result determined, wherein the spectral weighting coefficients are computed based on the dynamic noise overestimation factor; determining periods of speech pauses and periods of speech activity in the audio signal as a function of the speech detection result determined; and increasing a value of the dynamic noise overestimation factor for the periods of speech pauses determined relative to the value of the dynamic noise overestimation factor for the periods of speech activity determined, wherein increasing the value of the dynamic noise overestimation factor enables the spectral weighting coefficients computed to increase suppression of the background noise relative to an amount of suppression of the background noise for the periods of speech activity determined.

3. The method of claim 1, further including estimating a power spectrum of the audio signal based on a transformation of the audio signal from a time domain to a frequency domain, wherein the speech detection result determined is a function of a combination of feature values determined in the time domain, frequency domain, or a combination thereof.

4. The method of claim 3, wherein the combination of feature values includes kurtosis and at least one other feature value.

5. The method of claim 1, wherein the background noise includes stationary and non-stationary noise components.

6. The method of claim 5, wherein changes in a power spectrum of the audio signal over a time interval are less for the stationary noise components than for the non-stationary noise components.

7. The method of claim 5, further including: computing, dynamically, a dynamic noise floor; and selectively lowering the dynamic noise floor based on frequencies corresponding to the non-stationary noise components, wherein computing the spectral weighting coefficients is further based on the dynamic noise floor computed and selectively lowered.

8. A method of performing noise suppression of an audio signal, the audio signal including foreground speech components and background noise, the method comprising: determining, dynamically, a speech detection result indicating a likelihood of a presence of the foreground speech components in the audio signal; and computing, dynamically, spectral weighting coefficients based on the speech detection result determined and applying the spectral weighting coefficients computed to the audio signal to suppress the background noise in a dynamic manner, the method further including: identifying one or more spectral weighting coefficients from the spectral weighting coefficients computed based on contextual information from neighboring spectral weighting coefficients; and post-processing the spectral weighting coefficients computed by setting first values computed for the one or more spectral weighting coefficients identified to second values, the second values enabling a stronger attenuation of the background noise than the first values, and further wherein the applying includes applying the spectral weighting coefficients computed and post-processed.

9. The method of claim 1, further comprising: pre-processing the audio signal to pre-emphasize spectral characteristics of the audio signal and wherein: the speech detection result indicates the likelihood of the presence of the foreground speech components in the pre-processed audio signal; the determining and the computing are performed for a given time interval of the pre-processed audio signal; and the applying includes applying the spectral weighting coefficients computed to the pre-processed audio signal in the given time interval.

10. The method of claim 1, wherein the foreground speech components correspond to speech from a user speaking into an audio receiving device and further wherein the background noise includes babble noise, the babble noise including a composition of multiple background speech components from other speakers.

11. A system configured to perform noise suppression of an audio signal, the audio signal including foreground speech components and background noise, the system comprising: a soft speech detector configured to determine, dynamically, a speech detection result indicating a likelihood of a presence of the foreground speech components in the audio signal; and a noise suppressor communicatively coupled to the soft speech detector to receive the speech detection result determined and configured to compute, dynamically, spectral weighting coefficients based on the speech detection result determined and apply the spectral weighting coefficients computed to the audio signal to suppress the background noise in a dynamic manner.

12. The system of claim 11, wherein the noise suppressor is further configured to: compute, dynamically, a dynamic noise overestimation factor based on the speech detection result determined, wherein the spectral weighting coefficients are computed based on the dynamic noise overestimation factor; determine periods of speech pauses and periods of speech activity in the audio signal as a function of the speech detection result determined; and increase a value of the dynamic noise overestimation factor for the periods of speech pauses determined relative to the value of the dynamic noise overestimation factor for the periods of speech activity determined, wherein increasing the value of the dynamic noise overestimation factor enables the spectral weighting coefficients computed to increase suppression of the background noise relative to an amount of suppression of the background noise for the periods of speech activity determined.

13. The system of claim 11, further including a spectrum estimator configured to estimate a power spectrum of the audio signal based on a transformation of the audio signal from a time domain to a frequency domain, wherein the soft speech detector is further configured to determine the speech detection result as a function of a combination of feature values determined in the time domain, frequency domain, or a combination thereof.

14. The system of claim 13, wherein the combination of feature values includes kurtosis and at least one other feature value.

15. The system of claim 11, wherein the background noise includes stationary and non-stationary noise components and further wherein changes in a power spectrum of the audio signal over a time interval are less for the stationary noise components than for the non-stationary noise components.

16. The system of claim 15, wherein the noise suppressor is further configured to: compute, dynamically, a dynamic noise floor; and selectively lower the dynamic noise floor based on frequencies corresponding to the non-stationary noise components, wherein the spectral weighting coefficients are computed further based on the dynamic noise floor computed and selectively lowered.

17. A system configured to perform noise suppression of an audio signal, the audio signal including foreground speech components and background noise, the system comprising: a soft speech detector configured to determine, dynamically, a speech detection result indicating a likelihood of a presence of the foreground speech components in the audio signal; and a noise suppressor communicatively coupled to the soft speech detector to receive the speech detection result determined and configured to compute, dynamically, spectral weighting coefficients based on the speech detection result determined and apply the spectral weighting coefficients computed to the audio signal to suppress the background noise in a dynamic manner, wherein the noise suppressor is further configured to: identify one or more spectral weighting coefficients from the spectral weighting coefficients computed based on contextual information from neighboring spectral weighting coefficients; and post-process the spectral weighting coefficients computed by setting first values computed for the one or more spectral weighting coefficients identified to second values, the second values enabling a stronger attenuation of the background noise than the first values, and further wherein the applying includes applying the spectral weighting coefficients computed and post-processed.

18. The system of claim 11 further comprising a pre-processing unit wherein: the pre-processing unit is configured to pre-process the audio signal to pre-emphasize spectral characteristics of the audio signal; and the soft speech detector and the noise suppressor are further configured to determine and compute, respectively, for a given time interval of the pre-processed audio signal and further wherein the noise suppressor is still further configured to apply the spectral weighting coefficients computed to the pre-processed audio signal in the given time interval.

19. The system of claim 11, wherein the foreground speech components correspond to speech from a user speaking into an audio receiving device and further wherein the background noise includes babble noise, the babble noise including a composition of multiple background speech components from other speakers.

20. A non-transitory computer-readable medium having encoded thereon a sequence of instructions which, when loaded and executed by a processor, causes the processor to perform noise suppression of an audio signal including foreground speech components and background noise by: determining, dynamically, a speech detection result indicating a likelihood of presence of the foreground speech components in the audio signal; and computing, dynamically, spectral weighting coefficients based on the speech detection result determined and apply the spectral weighting coefficients computed to the audio signal to suppress the background noise in a dynamic manner.

21. The method of claim 1, further comprising computing, dynamically, a dynamic noise overestimation factor based on the speech detection result determined, wherein the spectral weighting coefficients are computed based on the dynamic noise overestimation factor.

22. The system of claim 11, wherein the noise suppressor is further configured to compute, dynamically, a dynamic noise overestimation factor based on the speech detection result determined, wherein the spectral weighting coefficients are computed based on the dynamic noise overestimation factor.

* * * * *